(12) United States Patent
Tompson et al.

(10) Patent No.: US 7,055,649 B2
(45) Date of Patent: Jun. 6, 2006

(54) MULTI-DENSITY SOUND ATTENUATING LAMINATES AND METHODS OF MAKING SAME

(75) Inventors: Graham Tompson, Northville, MI (US); Surendra Khambete, West Bloomfield, MI (US); Fred Skidmore, Marion, NC (US); Bill Griffin, Indian Trail, NC (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/929,289

(22) Filed: Aug. 30, 2004

(65) Prior Publication Data
US 2005/0023080 A1 Feb. 3, 2005

Related U.S. Application Data

(62) Division of application No. 10/011,103, filed on Dec. 7, 2001, now Pat. No. 6,802,389.

(51) Int. Cl.
*E04B 1/82* (2006.01)
*E04B 2/02* (2006.01)
*E04B 1/84* (2006.01)
*F02B 77/13* (2006.01)

(52) U.S. Cl. .............. 181/290; 181/294; 181/210; 181/204; 296/39.3

(58) Field of Classification Search ........... 181/296, 181/290, 294, 286, 204, 210, 205; 296/39.3; 180/69.22, 69.23; 428/95, 158, 96, 218
See application file for complete search history.

(56) References Cited

U.S. PATENT DOCUMENTS

| | | | |
|---|---|---|---|
| 2,861,022 A | 11/1958 | Lundsager | 154/129 |
| 3,021,914 A * | 2/1962 | Gerald | 181/290 |
| 3,573,131 A | 3/1971 | Rudloff | 156/306 |
| 4,056,161 A | 11/1977 | Allen, Jr. | 181/290 |
| 4,199,635 A | 4/1980 | Parker | |
| 4,213,516 A * | 7/1980 | Sulewsky | 181/286 |
| 4,214,646 A * | 7/1980 | Planes et al. | 181/287 |
| 4,324,831 A | 4/1982 | Parrini et al. | 428/288 |
| 4,385,955 A | 5/1983 | Doerfling et al. | |

(Continued)

FOREIGN PATENT DOCUMENTS

EP  0 453 877 A1  9/1985

(Continued)

OTHER PUBLICATIONS

European Search Report corresponding to EP 02 80 4676, dated Feb. 22, 2005.
Copy of International Search Report for PCT/US02/32557.

*Primary Examiner*—Edgardo San Martin
(74) *Attorney, Agent, or Firm*—Myers Bigel Sibley & Sajovec

(57) ABSTRACT

Sound attenuating laminates, and methods of making the same, are provided. Heat is applied to a surface of a non-woven, fibrous layer of material to form a stratum of melted fibers having a density greater than that of the remainder of the fibrous layer. The density of the melted fibers is effective in attenuating noise traversing the fibrous layer of material. Upholstery material, such as carpeting, is attached to the surface of the heated fibrous layer. The fibrous layer and upholstery material are then subjected to compressive molding pressure to obtain a desired shape. The compressive molding pressure may further tune the sound attenuating properties of the fibrous layer by selectively changing the densities of portions of the fibrous layer.

33 Claims, 7 Drawing Sheets

U.S. PATENT DOCUMENTS

| | | | |
|---|---|---|---|
| 4,428,454 A * | 1/1984 | Capaul et al. | 181/290 |
| 4,488,619 A | 12/1984 | O'Neill | 181/290 |
| 4,529,639 A | 7/1985 | Peoples, Jr. et al. | 428/95 |
| 4,539,252 A | 9/1985 | Franz | |
| 4,661,392 A * | 4/1987 | Kapstad | 428/182 |
| 4,741,945 A | 5/1988 | Brant et al. | 428/158 |
| 4,838,524 A * | 6/1989 | McKeown et al. | 256/24 |
| 4,851,283 A | 7/1989 | Holtrop et al. | 428/284 |
| 4,966,799 A | 10/1990 | Lucca et al. | 428/95 |
| 5,245,141 A | 9/1993 | Fortez et al. | 181/288 |
| 5,273,698 A | 12/1993 | Thary | 264/46.4 |
| 5,296,657 A | 3/1994 | Gilliland et al. | 181/294 |
| 5,298,694 A | 3/1994 | Thompson et al. | 181/286 |
| 5,456,872 A | 10/1995 | Ahrweiler | 264/115 |
| 5,468,793 A | 11/1995 | Ward et al. | 524/159 |
| 5,554,238 A | 9/1996 | English | 156/62.2 |
| 5,554,830 A | 9/1996 | Muller et al. | 181/290 |
| 5,554,831 A | 9/1996 | Matsukawa et al. | 181/294 |
| 5,677,027 A | 10/1997 | Masuda et al. | 428/96 |
| 5,741,390 A | 4/1998 | Schmuck et al. | 156/280 |
| 5,744,763 A | 4/1998 | Iwasa et al. | |
| 5,817,408 A | 10/1998 | Orimo et al. | 428/218 |
| 5,841,081 A | 11/1998 | Thompson et al. | 181/286 |
| 6,102,465 A * | 8/2000 | Nemoto et al. | 296/39.3 |
| 6,109,389 A * | 8/2000 | Hiers et al. | 181/290 |
| 6,296,075 B1 * | 10/2001 | Gish et al. | 181/290 |
| 6,659,223 B1 * | 12/2003 | Allison et al. | 181/290 |
| 6,722,466 B1 * | 4/2004 | Tong et al. | 181/200 |
| 2004/0055813 A1 * | 3/2004 | Tsuiki et al. | 181/204 |

FOREIGN PATENT DOCUMENTS

| | | |
|---|---|---|
| GB | 482809 | 4/1938 |
| JP | 06056027 A * | 3/1994 |
| JP | 2000334850 | 5/2000 |
| WO | WO 98/18656 | 5/1998 |
| WO | WO 98/18657 | 5/1998 |

* cited by examiner

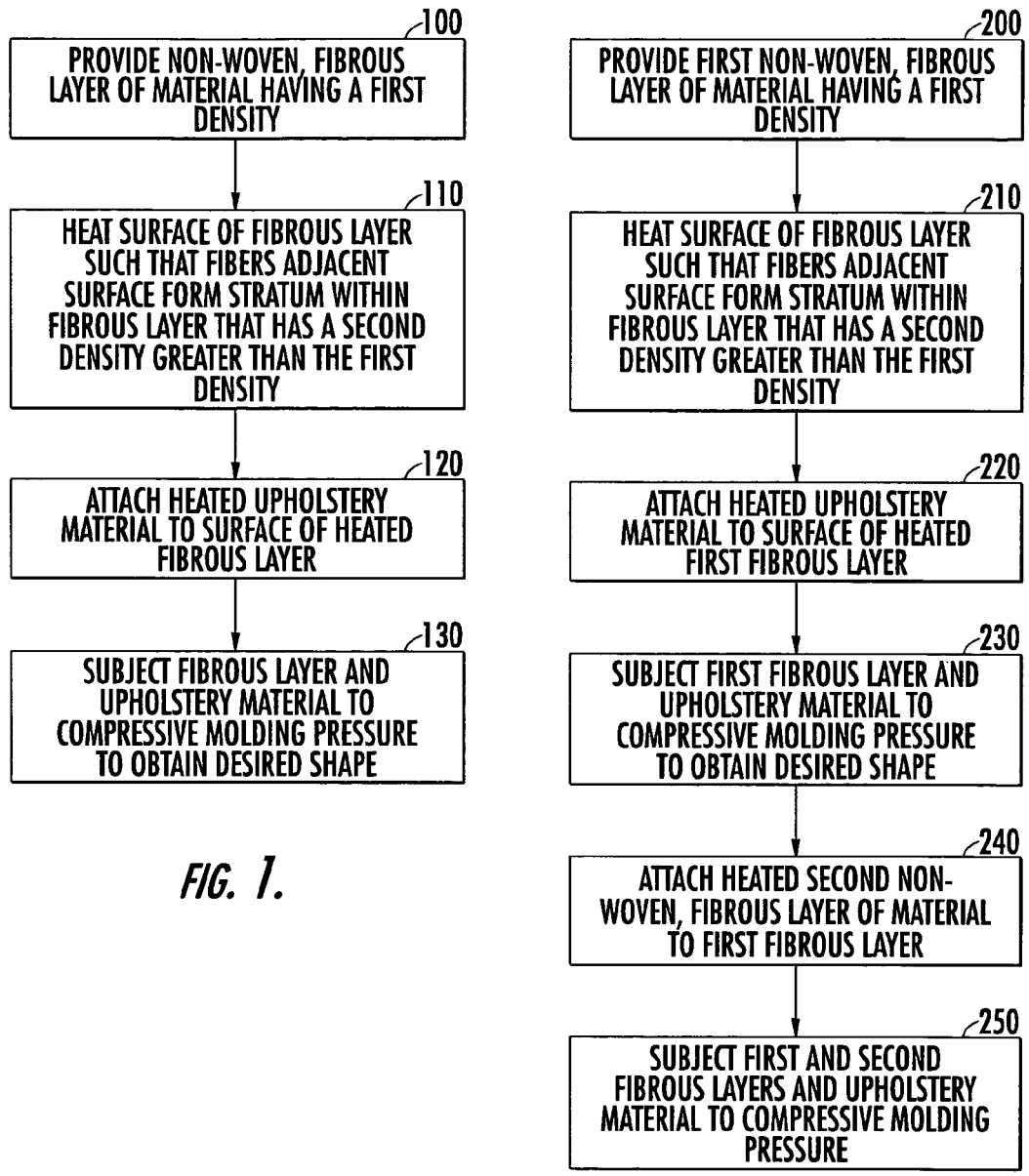

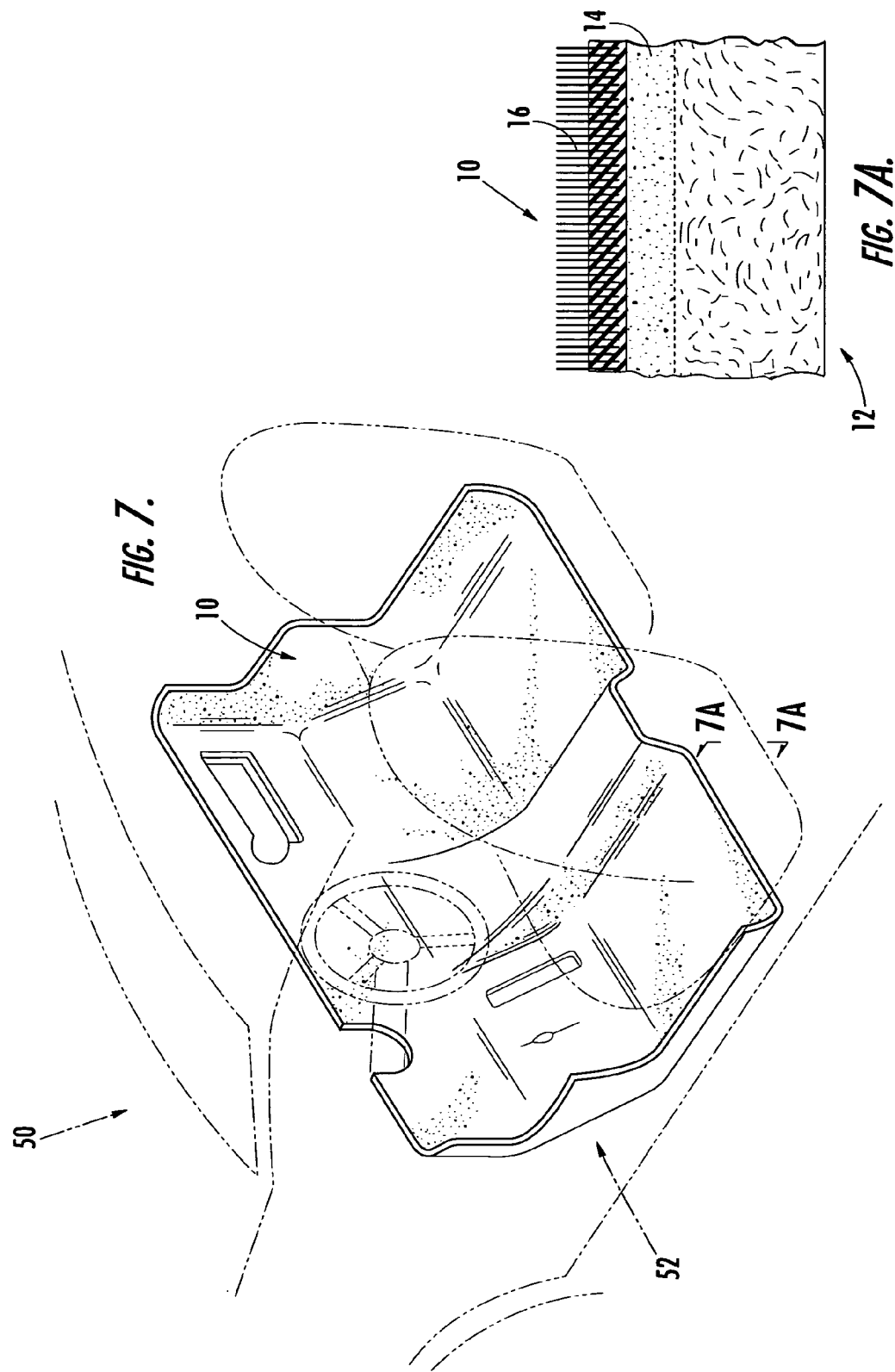

MULTI-DENSITY SOUND ATTENUATING LAMINATES AND METHODS OF MAKING SAME

RELATED APPLICATION

This application is a Divisional application of U.S. patent application Ser. No. 10/011,103 filed Dec. 7, 2001 now U.S. Pat. No. 6,802,389, which is incorporated herein by reference in its entirety.

FIELD OF THE INVENTION

The present invention relates generally to acoustical insulation materials and, more particularly, to acoustical insulation materials utilized within vehicles.

BACKGROUND OF THE INVENTION

It is generally considered desirable to reduce noises generated from appliances, and from within buildings, vehicles, and the like. With respect to vehicles, road noise, tire noise, engine noise, vehicle vibrations, etc., may pass through a vehicle body and into the passenger compartment.

It is generally considered desirable to reduce the level of noise within a vehicle passenger compartment. Noises, such as road noise, engine noise, vibrations, etc., may be attenuated through the use of various acoustically absorptive (or reflective) materials. For example, sound attenuating materials are conventionally provided in conjunction with carpeting, door panels, and headliners.

Various sound attenuating materials have been developed for use in reducing noise levels within passenger compartments of vehicles. For example, U.S. Pat. No. 4,851,283 to Holtrop et al., proposes a thermoformable laminate for use in headliners. The headliner comprises a non-woven fabric bonded to a foamed polymer sheet. The fabric is formed from a blend of low melting staple fibers and high melting staple fibers.

U.S. Pat. No. 5,298,694 to Thompson proposes a non-woven acoustical insulation web. The web comprises thermoplastic fibers, and particularly a blend of melt-blown microfibers and crimped bulking fibers.

U.S. Pat. No. 5,677,027 to Masuda et al., proposes a sound insulating structure comprising a covering layer, a panel, and a cushioning layer. The cushioning layer comprises a first fiber such as polyethylene terephthalate (PET) and a second fiber that is of a shell-core construction wherein the majority of the core is PET.

U.S. Pat. No. 5,817,408 to Orimo et al., proposes a sound insulating structure which includes low and high density thermoplastic fibers. PET is preferred as a thermoplastic synthetic fiber.

U.S. Pat. No. 4,529,639 to Peoples, Jr. et al. proposes a molded foam-backed carpet assembly which includes a carpet layer, a moldable thermoplastic polymer layer and one or more foam pads fusibly bonded to the thermoplastic layer and extending over less than the entire surface of the thermoplastic polymer layer to provide desired cushioning and sound and thermal insulation only in preselected areas of the carpet.

In general, the ability of conventional materials to attenuate sound increases as the amount of material increases. Unfortunately, increased materials often increases the weight of sound attenuating material, which may be undesirable. Accordingly, there is a continuing need for acoustical insulation materials that exhibit superior sound attenuating properties, while also being lightweight and low in cost.

SUMMARY OF THE INVENTION

In view of the above discussion, sound attenuating laminates, and methods of making the same, are provided. According to an embodiment of the present invention, a surface of a non-woven (or woven), fibrous layer of material (e.g., containing thermoplastic or thermosetting fibers) is heated to form a stratum of melted fibers having a density different (i.e., greater) than that of the remainder of the fibrous layer. The density of the melted fibers is effective in attenuating noise traversing the fibrous layer of material. Upholstery material (preferably heated), such as carpeting, is attached to a surface (either adjacent to or opposite from stratum of melted fibers) of the heated fibrous layer. The fibrous layer and upholstery material is then subjected to compressive molding pressure to obtain a desired shape. The compressive molding pressure may further tune the sound attenuating properties of the fibrous layer by selectively changing the densities of one or more portions of the fibrous layer.

According to other embodiments of the present invention, a surface of a first non-woven (or woven), fibrous layer of material is heated such that fibers adjacent the surface form a stratum of melted fibers that has a density greater than a density of the remainder of the fibrous layer. The density of the stratum is effective to attenuate noise traversing the first fibrous layer of material. Upholstery material, such as carpeting, is attached to a surface (either adjacent to or opposite from stratum of melted fibers) of the heated first fibrous layer. The first fibrous layer and upholstery material are then subjected to compressive molding pressure (preferably in the presence of heat) to obtain a desired shape. The compressive molding pressure may further tune the sound attenuating properties of the first fibrous layer by selectively changing the densities of portions of the fibrous layer. A second non-woven (preferably heated), fibrous layer of material is attached to an opposite surface of the first fibrous layer. The first and second fibrous layers and upholstery material are then subjected to compressive molding pressure (preferably in the presence of heat). The compressive molding pressure may further tune the sound attenuating properties of the combined first and second fibrous layers by selectively changing the densities of portions of the first and second fibrous layers.

By controlling and differentially molding and/or melting fibers through temperature and pressure variation, laminates according to embodiments of the present invention can be "tuned" to provide desired sound deadening and absorption properties in selected locations. The term "tuned" means that portions of laminates can be formed to have a specific acoustic impedance designed to attenuate sound in one or more frequencies or frequency bands. Moreover, laminates according to embodiments of the present invention may have reduced overall weight compared with conventional sound proofing materials, and without sacrificing sound attenuation properties.

BRIEF DESCRIPTION OF THE DRAWINGS

The accompanying drawings, which form a part of the specification, illustrate key embodiments of the present invention. The drawings and description together serve to fully explain the invention.

FIG. 1 is a flowchart of operations for producing a sound attenuating laminate configured to attenuate noise from a noise source, according to embodiments of the present invention.

FIG. 2 is a flowchart of operations for producing a sound attenuating laminate configured to attenuate noise from a noise source, according to other embodiments of the present invention.

FIG. 7 is a partial perspective view of an interior compartment of a vehicle wherein a sound attenuating laminate according to embodiments of the present invention is attached thereto.

FIG. 7A is an enlarged partial section view of the sound attenuating laminate of FIG. 7 taken along lines 7A—7A.

DETAILED DESCRIPTION OF THE INVENTION

Figure 3:
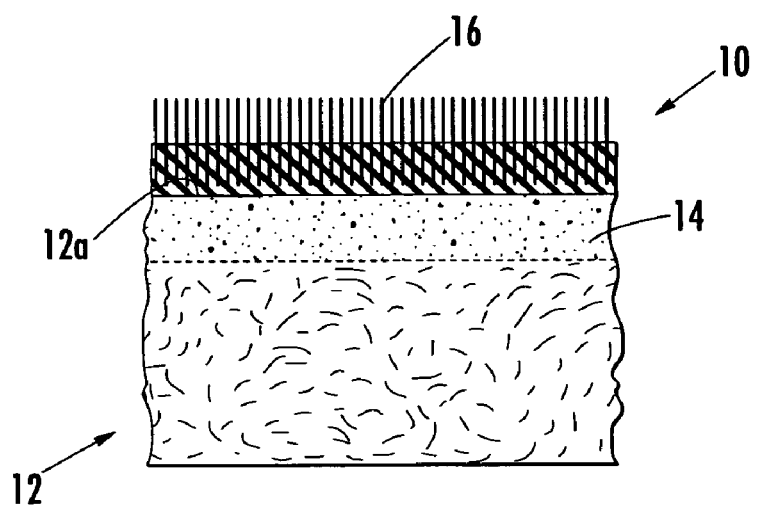
FIG. 3 is a cross-sectional view of a sound attenuating laminate configured to attenuate noise from a noise source, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Embodiments of the present invention provide sound attenuating laminates for use in various applications, particularly automotive applications. Exemplary automotive applications within which sound attenuating laminates according to embodiments of the present invention may be utilized include, but are not limited to, headliners, dashboards, carpeting, door panels, and pillars.

According to embodiments of the present invention, a sound attenuation laminate includes a fibrous layer of material. By selectively controlling heat and/or pressure parameters over a predetermined time interval, the fibers are differentially melted. A less dense portion or stratum of melted fibers is formed that is configured to be placed against the metal (or other) portion of a vehicle, and a compacted, higher density portion or stratum of melted fibers is formed that is configured to be bonded to upholstery material, such as carpeting and decorative fabric. However, it is not required that the higher density portion be bonded to upholstery fabric. The higher density portion may be placed against the metal (or other) portion of a vehicle.

By controlling and differentially molding and/or melting the fibers through temperature and pressure variation, a fibrous layer can be "tuned" to provide desired sound deadening and absorption properties in selected locations. Moreover, laminates according to embodiments of the present invention may have reduced overall weight without sacrificing soundproofing properties.

In addition, embodiments of the present invention are not limited to a unidirectional density gradient (i.e., from less dense to more dense). Embodiments of the present invention may have various density gradients (e.g., dense, less dense, more dense, etc.).

Referring to FIG. 1, a method of producing a sound attenuating laminate configured to attenuate noise from a noise source, according to embodiments of the present invention, is illustrated. A non-woven, fibrous layer of material having a first density is provided (Block 100). Fibers within the layer may include natural fibers, thermosetting fibers, thermoplastic fibers, and/or any blend or percentage of natural fibers, thermosetting fibers and/or thermoplastic fibers. Exemplary fibers include, but are not limited to, acetate, acrylic, nylon 6, nylon 6/6, polyethylene terephthalate (PET), recycled PET, BiCo PET, and NOMEX® brand fibers. A preferred fiber is PET fiber.

A surface of the fibrous layer is heated such that fibers adjacent the surface form a stratum of melted fibers within the fibrous layer that has a second density greater than the first density (Block 110). Exemplary heat applied to the surface of the fibrous layer may be at a temperature of between about 400° F. and about 480° F., preferably between about 450° F. and about 460° F. However, embodiments of the present invention are not limited to these temperatures. Temperatures may vary depending on the fibers utilized. In addition, melting may occur in various ways and is not limited to conventional heating methods. For example, energy in the form of microwaves and infrared radiation may be utilized to melt fibers. As used throughout, the term "heat" shall be intended to include all forms of energy capable of melting fibers according to embodiments of the present invention.

The density of the fibers within the stratum of melted fibers is effective to attenuate noise traversing the fibrous layer of material. Exemplary thickness of the stratum of melted fibers may be between about one millimeter (1 mm) and about four millimeters (4 mm). By controlling the amount of heat applied, different densities can be achieved to thereby "tune" the fibrous layer to attenuate noise at selective frequencies.

A heated upholstery material, such as carpeting and/or other fabric, is attached to the surface of the heated fibrous layer (Block 120). In the case of carpeting, the backing side of the carpeting is attached to the fibrous layer surface. The fibrous layer and upholstery material are then subjected to compressive molding pressure to obtain a desired shape (Block 130). The compressive molding pressure may further tune the sound attenuating properties of the fibrous layer by selectively changing the densities of portions of the fibrous layer. Exemplary compressive molding pressure may be between about two pounds per square inch (2 psi) and about eleven and one half pounds per square inch (11.5 psi), preferably between about between about two and one half pounds per square inch (2.5 psi) and about three and one half pounds per square inch (3.5 psi). However, embodiments of the present invention are not limited to these pressures. Pressures may vary depending on the fibers utilized.

Referring to FIG. 2, a method of producing a sound attenuating laminate configured to attenuate noise from a noise source, according to other embodiments of the present invention, is illustrated. A first non-woven, fibrous layer of material (e.g., containing thermoplastic and/or thermosetting fibers) having a first-density is provided (Block 200). Heat is applied to a first surface of the first fibrous layer such that fibers adjacent the first surface form a stratum of melted fibers that has a second density greater than the first density and that is effective to attenuate noise traversing the first fibrous layer of material (Block 210). Exemplary heat applied to the surface of the fibrous layer may be at a temperature of between about 400° F. and about 470° F., preferably between about 450° F. and about 480° F. However, embodiments of the present invention are not limited to these temperatures. Temperatures may vary depending on the fibers utilized.

Upholstery material (preferably heated), such as carpeting and/or other fabric, is attached to a surface of the heated fibrous layer (Block 220). In the case of carpeting, the backing side of the carpeting is attached to the first fibrous layer surface. The first fibrous layer and upholstery material are then subjected to compressive molding pressure to obtain a desired shape (Block 230). The compressive molding pressure may further tune the sound attenuating properties of the first fibrous layer by selectively changing the densities of portions of the fibrous layer. Exemplary compressive molding pressure may be between about two pounds per square inch (2 psi) and about eleven and one half pounds per square inch (11.5 psi), preferably between about between about two and one half pounds per square inch (2.5 psi) and about three and one half pounds per square inch (3.5 psi). However, embodiments of the present invention are not limited to these pressures. Pressures may vary depending on the fibers utilized.

A second non-woven (preferably heated), fibrous layer of material is attached to an opposite surface of the first fibrous layer (Block 240). The first and second fibrous layers and upholstery material are then subjected to compressive molding pressure (Block 250). The compressive molding pressure may further tune the sound attenuating properties of the combined first and second fibrous layers by selectively changing the densities of portions of the first and second fibrous layers. Exemplary compressive molding pressure may be between about two pounds per square inch (2 psi) and about four pounds per square inch (4 psi), preferably between about between about two and one half pounds per square inch (2.5 psi) and about three and one half pounds per square inch (3.5 psi). However, embodiments of the present invention are not limited to these pressures. Pressures may vary depending on the fibers utilized.

Referring to FIG. 3, a sound attenuating laminate 10 that is configured to attenuate noise from a noise source, according to embodiments of the present invention, is illustrated. The illustrated sound attenuating laminate 10 is carpeting material for use within the passenger compartment of a vehicle. However, embodiments of the present invention are not limited to carpeting applications. Other exemplary automotive applications within which sound attenuating laminates according to embodiments of the present invention may be utilized include, but are not limited to, headliners, dashboards, carpeting, door panels, and pillars. Moreover, applications in which sound attenuating laminates according to embodiments of the present invention are used are not limited to vehicle applications.

The illustrated sound attenuating laminate 10 includes a non-woven, fibrous layer of material 12 having a stratum 14 of melted and/or molded fibers (e.g., PET fibers) adjacent a surface 12a of the fibrous layer 12 and carpeting 16 attached to the surface 12a of the fibrous layer 12. The stratum 14 of melted and/or molded fibers has a density that is greater than the density of the remaining portion of the fibrous layer of material 12 and that is effective to attenuate noise traversing the fibrous layer of material 12. Depending on the application in which the sound attenuating laminate 10 is used, the stratum 14 of melted and/or molded fibers may have a thickness of between about one millimeter (1 mm) and about four millimeters (4 mm).

Figure 4A:
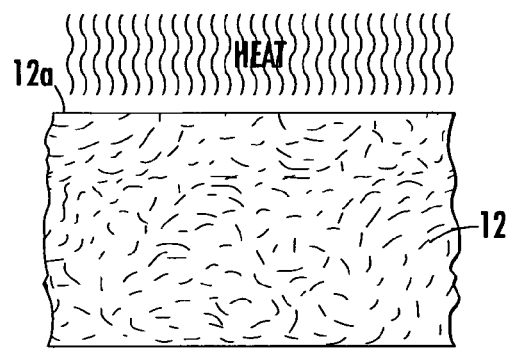
FIGS. 4A–4E schematically illustrate operations for producing the sound attenuating laminate of FIG. 3.
Figure 4B:
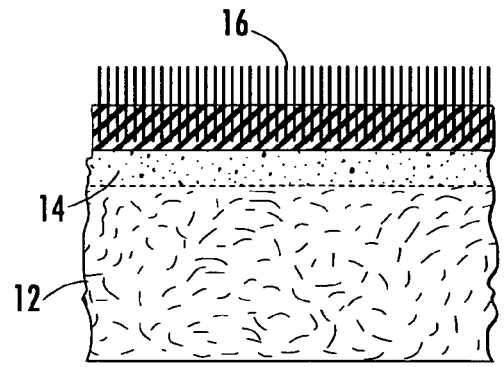
Figure 4C:
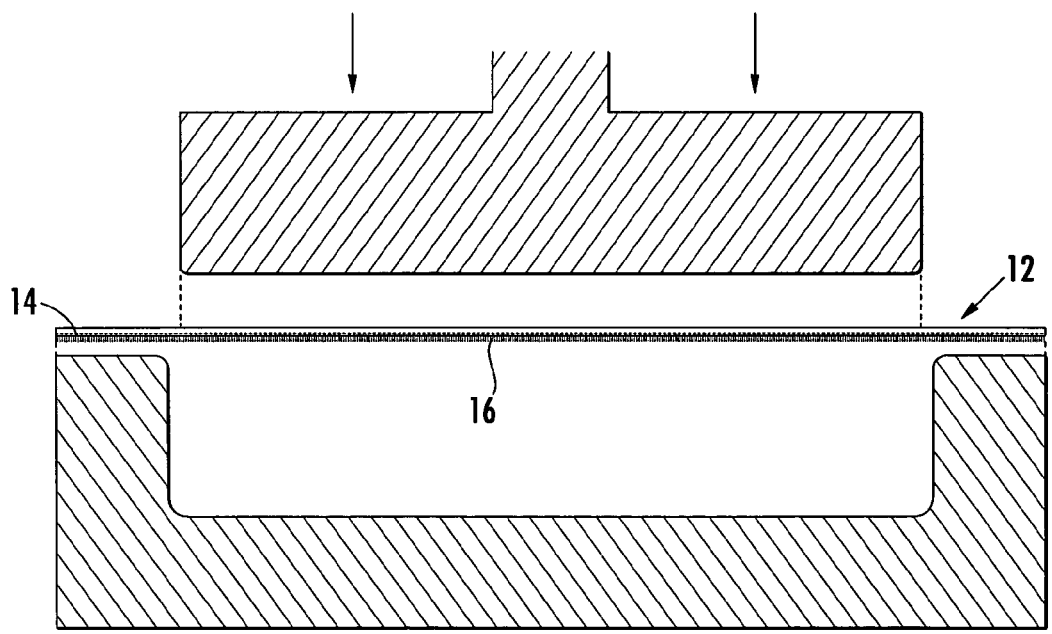
Figure 4D:
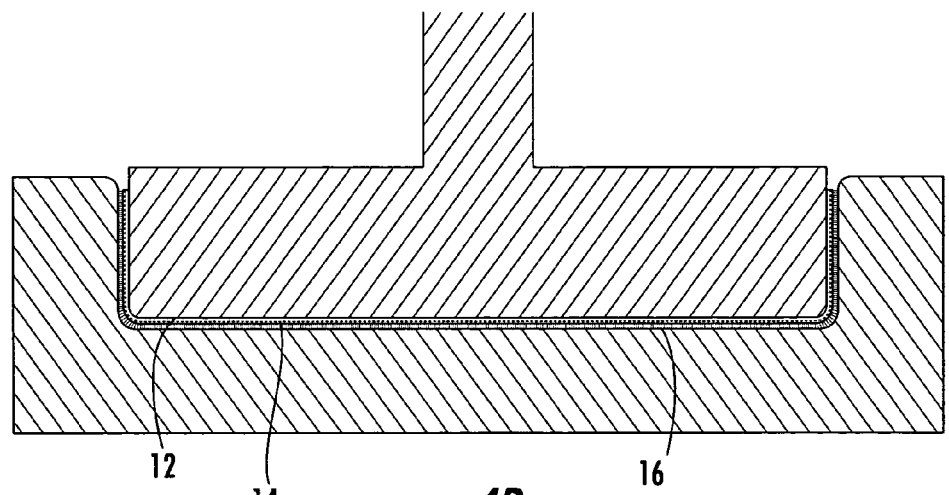
Figure 4E:
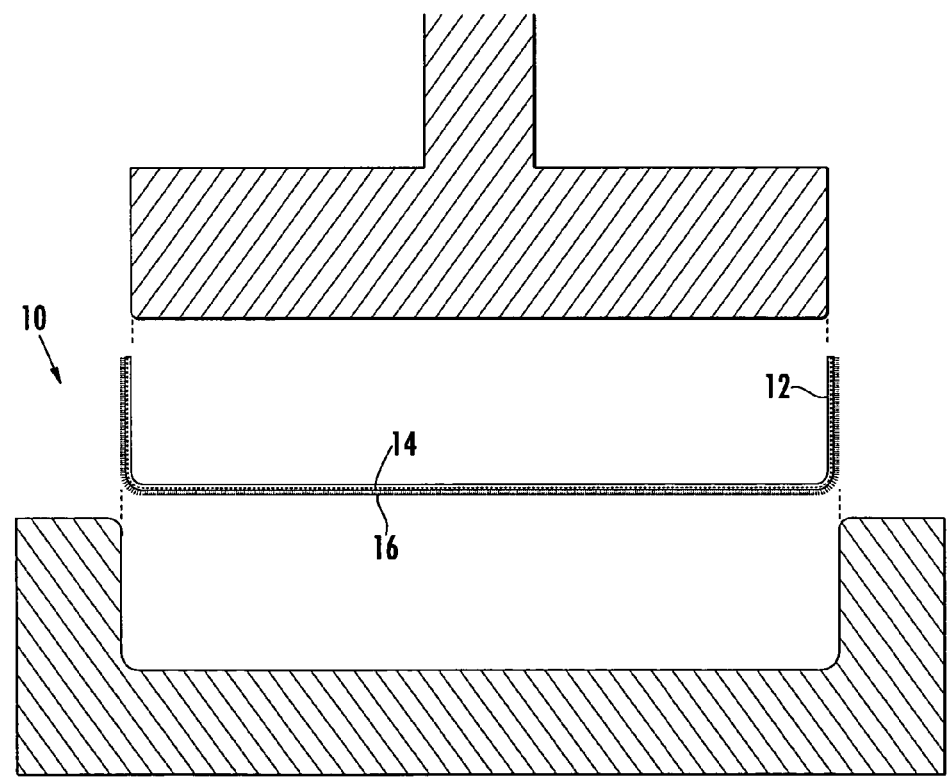

Referring to FIGS. 4A–4E, operations for producing the exemplary sound attenuating laminate 10 of FIG. 3 are illustrated. A surface 12a of the fibrous layer of material 12 is heated (FIG. 4A) to form a stratum 14 of melted fibers adjacent the surface, and heated upholstery material such as carpeting 16 is added (FIG. 4B). The fibrous layer 12 having a densified (i.e., multi-density) stratum of fibers (and including a layer of upholstery) is subjected to compressive molding pressure to obtain a desired shape (FIGS. 4C–4E).

Figure 5:
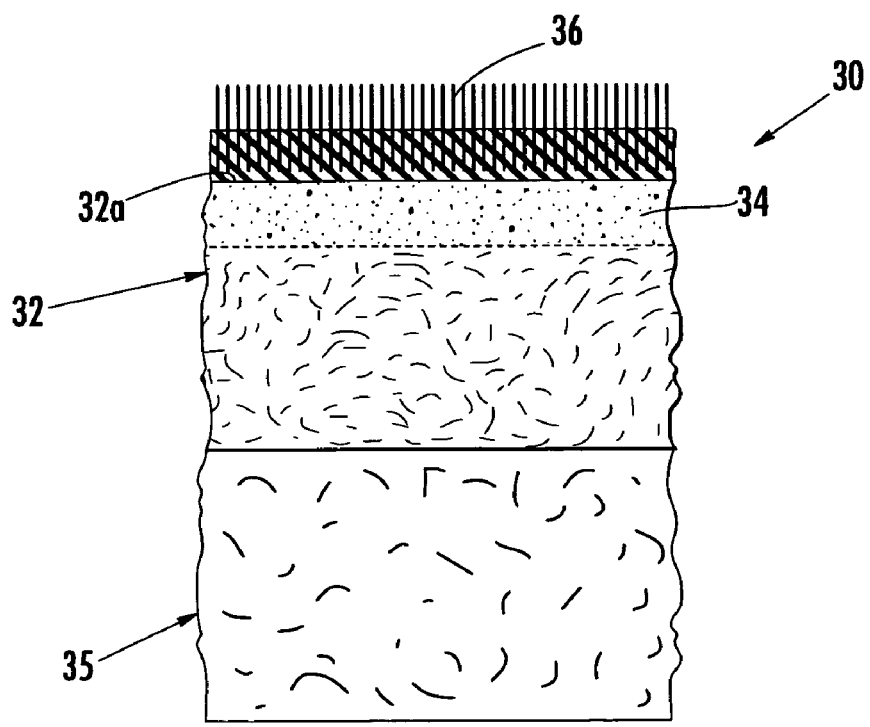
FIG. 5 is a cross-sectional view of a sound attenuating laminate configured to attenuate noise from a noise source, according to other embodiments of the present invention.

Referring to FIG. 5, a sound attenuating laminate 30 that is configured to attenuate noise from a noise source, according to other embodiments of the present invention, is illustrated. The illustrated sound attenuating laminate 30 is configured for use as carpeting within vehicle passenger compartments. However, sound attenuating laminates having the illustrated configuration may be used in various applications, without limitation.

The illustrated sound attenuating laminate 30 includes a first non-woven, fibrous layer of material 32 having a stratum of melted and/or molded fibers 34 (e.g., PET fibers) adjacent a surface 32a of the first fibrous layer 32 and carpeting 36 attached to the surface 32a of the fibrous layer 32. The stratum of melted and/or molded fibers 34 has a density greater than the density of the remaining portion of the first fibrous layer 32 and is effective to attenuate noise traversing the first fibrous layer of material 32.

A second non-woven fibrous layer of material 35 is attached to the first non-woven, fibrous layer 32. The second non-woven fibrous layer of material 35 may have a density (or densities) similar to or different from the density of the stratum of melted and/or molded fibers 34 and of the remaining portion of the first fibrous layer 32. Carpeting 36 is attached to a surface of the first fibrous layer of material 32.

Figure 6A:
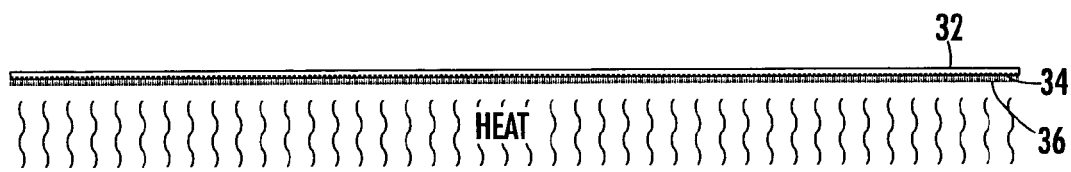
FIGS. 6A–6D schematically illustrate operations for producing the sound attenuating laminate of FIG. 5.
Figure 6B:
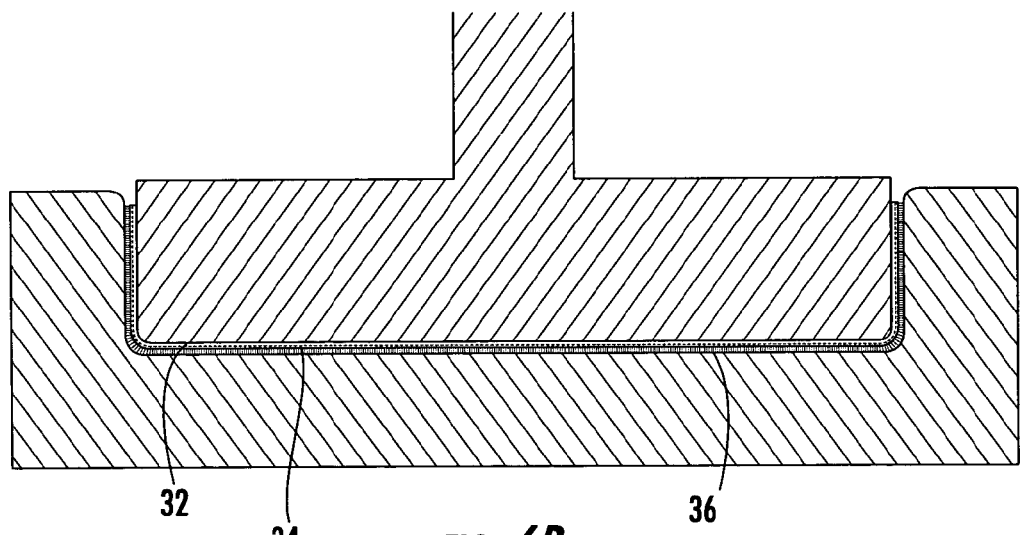
Figure 6C:
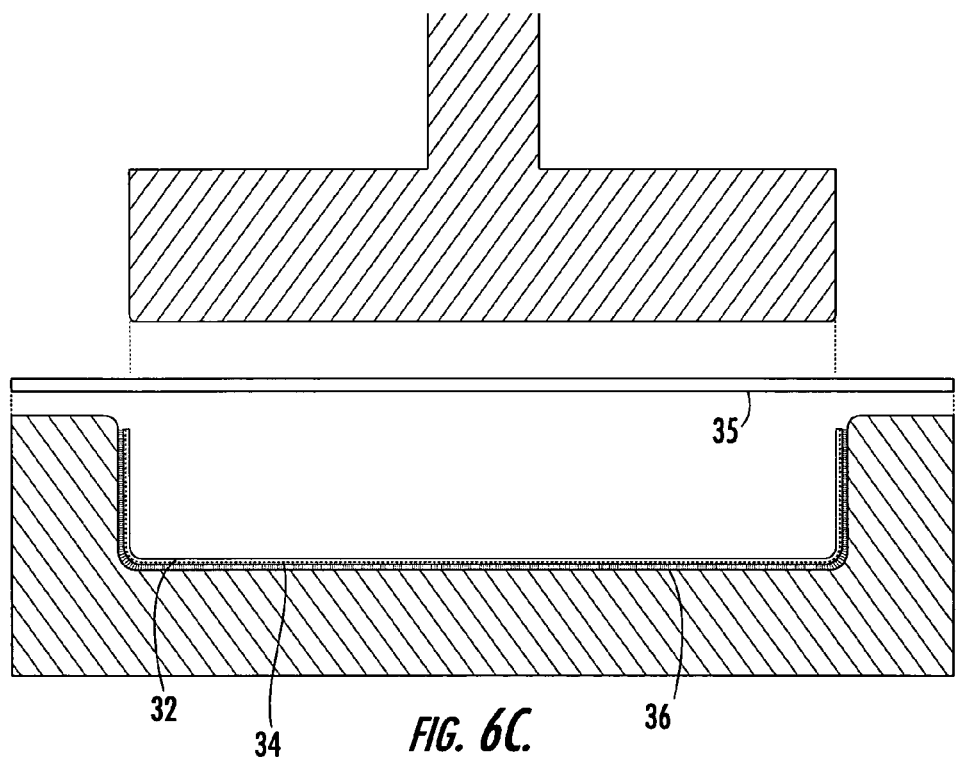
Figure 6D:
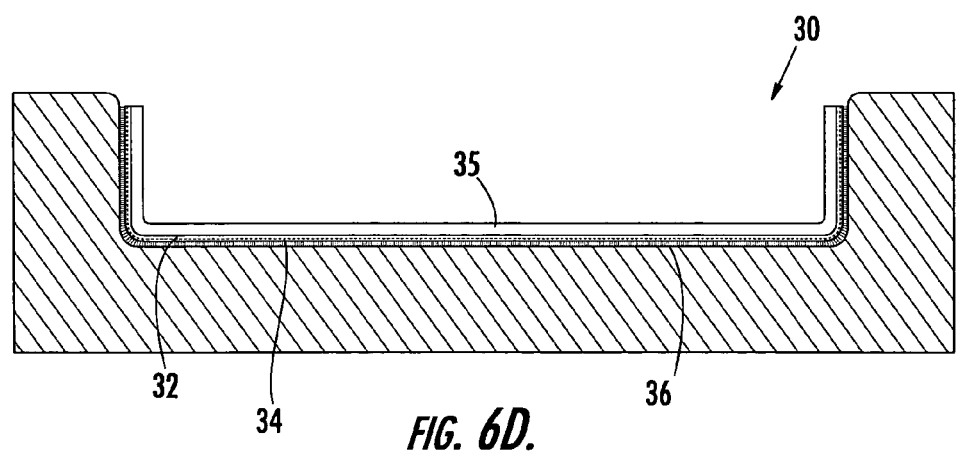

Referring to FIGS. 6A–6D, operations for producing the sound attenuating laminate 30 of FIG. 5 are illustrated. A surface 32a of a fibrous layer of material 32 having carpeting 36 attached thereto is heated and/or molded to form a stratum 34 of melted and/or molded fibers adjacent the carpeting 36 (FIG. 6A). The fibrous layer 32 and carpeting are subjected to compressive molding pressure to obtain a desired shape (FIG. 6B). A heated second non-woven fibrous layer of material 35 is attached to the first non-woven, fibrous layer 32 and subjected to compressive molding to produce the sound attenuating laminate 30 (FIGS. 6C–6D).

Referring to FIGS. 7 and 7A, an interior compartment 52 of a vehicle 50 is illustrated with a sound attenuating laminate 10 according to embodiments of the present invention attached to a portion thereof. The illustrated sound attenuating laminate 10 includes a non-woven, fibrous layer of material 12 having a stratum 14 of melted fibers with a greater density than that of the remaining portion of the fibrous layer of material 12. The density of the stratum 14 of melted fibers is effective to attenuate noise traversing the fibrous layer of material 12 from a noise source external to the vehicle compartment 52.

EXAMPLE

A fibrous layer of PET fibers was heated with hot air at 420° F. for 92 seconds. Carpeting material was heated via infrared radiation to a temperature of 330° F. and attached to the fibrous layer. The laminate formed by the fibrous layer and carpeting material was subjected to compressive pressure of between about two pounds per square inch and about eleven pounds per square inch (2–11 psi) via a mold to produce a densified laminate. The laminate was removed from the mold, cooled, and trimmed via a water jet.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A sound attenuating laminate configured to attenuate noise from a noise source, comprising:
   a single non-woven, fibrous layer of material having a first stratum of molded fibers that has a first density and a second stratum of melted fibers that has a second density greater than the first density and that is effective to attenuate noise traversing the fibrous layer; and
   upholstery material attached to a surface of the fibrous layer.

2. The sound attenuating laminate of claim 1, wherein the first stratum of molded fibers has a thickness of between about four millimeters (4 mm) and about twenty six millimeters (26 mm), and wherein the second stratum of melted fibers has a thickness of between about one millimeter (1 mm) and about four millimeters (4 mm).

3. The sound attenuating laminate of claim 1, wherein the fibrous layer comprises fibers selected from the group consisting of thermosetting fibers and thermoplastic fibers.

4. The sound attenuating laminate of claim 1, wherein the fibrous layer comprises polyethylene terephthalate (PET) fibers.

5. The sound attenuating laminate of claim 1, wherein the upholstery material comprises carpeting.

6. A sound attenuating laminate configured to attenuate noise from a noise source, comprising:
   a first single non-woven, fibrous layer of material having a first stratum of molded fibers that has a first density and a second stratum of melted fibers that has a second density greater than the first density and that is effective to attenuate noise traversing the fibrous layer;
   a second non-woven fibrous layer of material attached to the first non-woven, fibrous layer; and
   upholstery material attached to a surface of the first fibrous layer.

7. The sound attenuating laminate of claim 6, wherein the first stratum of molded fibers has a thickness of between about four millimeters (4 mm) and about twenty six millimeters (26 mm), and wherein the second stratum of melted fibers has a thickness of between about one millimeter (1 mm) and about four millimeters (4 mm).

8. The sound attenuating laminate of claim 6, wherein the first and second fibrous layers comprise fibers selected from the group consisting of thermosetting fibers and thermoplastic fibers.

9. The sound attenuating laminate of claim 6, wherein the first and second fibrous layers comprise polyethylene terephthalate (PET) fibers.

10. The sound attenuating laminate of claim 6, wherein the upholstery material comprises carpeting.

11. A vehicle, comprising:
    an interior compartment comprising a panel having a surface; and
    sound insulating material attached to the panel surface, comprising a single non-woven, fibrous layer of material having a first stratum of molded fibers that has a first density and a second stratum of melted fibers that has a second density greater than the first density and that is effective to attenuate noise traversing the fibrous layer.

12. The vehicle of claim 11, further comprising upholstery material attached to a surface of the fibrous layer.

13. The vehicle of claim 11, wherein the first stratum of molded fibers has a thickness of between about four millimeters (4 mm) and about twenty six millimeters (26 mm), and wherein the second stratum of melted fibers has a thickness of between about one millimeter (1 mm) and about four millimeters (4 mm).

14. The vehicle of claim 11, wherein the fibrous layer comprises fibers selected from the group consisting of thermosetting fibers and thermoplastic fibers.

15. The vehicle of claim 11, wherein the fibrous layer comprises polyethylene terephthalate (PET) fibers.

16. The vehicle of claim 11, wherein the upholstery material comprises carpeting.

17. A vehicle, comprising:
    an interior compartment comprising a panel having a surface; and
    sound insulating material attached to the panel surface, comprising:
      a first single non-woven, fibrous layer of material having a first stratum of molded fibers that has a first density and a second stratum of melted fibers that has a second density greater than the first density and that is effective to attenuate noise traversing the fibrous layer; and
      a second non-woven fibrous layer of material attached to the first non-woven, fibrous layer.

18. The vehicle of claim 17, further comprising upholstery material attached to a surface of the first fibrous layer.

19. The vehicle of claim 17, wherein the first and second fibrous layers comprises fibers selected from the group consisting of thermosetting fibers and thermoplastic fibers.

20. The vehicle of claim 17, wherein the first and second fibrous layers comprises polyethylene terephthalate (PET) fibers.

21. The vehicle of claim 18, wherein the upholstery material comprises carpeting.

22. A sound attenuating laminate configured to attenuate noise from a noise source, comprising a single non-woven, fibrous layer of material having a first stratum of molded fibers with a first density, a second stratum of molded fibers with a second density greater than the first density, and a third stratum of melted fibers with a third density greater that the second density, and wherein the first, second and third stratums are arranged with a unidirectional density gradient.

23. The sound attenuating laminate of claim 22, further comprising upholstery material attached to a surface of the fibrous layer.

24. The sound attenuating laminate of claim 22, wherein the third stratum of melted fibers has a thickness of between about one millimeter (1 mm) and about four millimeters (4 mm).

25. The sound attenuating laminate of claim 22, wherein the first and second fibrous layers comprises fibers selected from the group consisting of thermosetting fibers and thermoplastic fibers.

26. The sound attenuating laminate of claim 22, wherein the first and second fibrous layers comprises polyethylene terephthalate (PET) fibers.

27. The sound attenuating laminate of claim 23, wherein the upholstery material comprises carpeting.

28. A sound attenuating laminate configured to attenuate noise from a noise source, comprising a single non-woven, fibrous layer of material having a first stratum of molded fibers with a first density, a second stratum of molded fibers with a second density greater than the first density, and a third stratum of melted fibers with a third density greater that the second density, and wherein the first, second and third stratums are arranged with a non-unidirectional density gradient.

29. The sound attenuating laminate of claim 28, further comprising upholstery material attached to a surface of the fibrous layer.

30. The sound attenuating laminate of claim 28, wherein the third stratum of melted fibers has a thickness of between about one millimeter (1 mm) and about four millimeters (4 mm).

31. The sound attenuating laminate of claim 28, wherein the first and second fibrous layers comprises fibers selected from the group consisting of thermosetting fibers and thermoplastic fibers.

32. The sound attenuating laminate of claim 28, wherein the first and second fibrous layers comprises polyethylene terephthalate (PET) fibers.

33. The sound attenuating laminate of claim 29, wherein the upholstery material comprises carpeting.

* * * * *

UNITED STATES PATENT AND TRADEMARK OFFICE
CERTIFICATE OF CORRECTION

| | | |
|---|---|---|
| PATENT NO. | : 7,055,649 B2 | Page 1 of 1 |
| APPLICATION NO. | : 10/929289 | |
| DATED | : June 6, 2006 | |
| INVENTOR(S) | : Tompson et al. | |

It is certified that error appears in the above-identified patent and that said Letters Patent is hereby corrected as shown below:

Column 8,
Line 57 should read -- fibrous layers comprise fibers selected from the group --

Line 60 should read -- fibrous layers comprise polyethylene terephthalate (PET) --

Column 9,
Line 13 should read -- the first and second fibrous layers comprise fibers selected --

Line 17 should read -- the first and second fibrous layers comprise polyethylene --

Column 10,
Line 14 should read -- the first and second fibrous layers comprise fibers selected --

Line 18 should read -- the first and second fibrous layers comprise polyethylene --

Signed and Sealed this

Tenth Day of October, 2006

JON W. DUDAS
*Director of the United States Patent and Trademark Office*